United States Patent
Barber et al.

(10) Patent No.: US 10,503,731 B2
(45) Date of Patent: Dec. 10, 2019

(54) EFFICIENT ANALYSIS OF DISTINCT AGGREGATIONS

(71) Applicant: International Business Machines Corporation, Armonk, NY (US)

(72) Inventors: Ronald J. Barber, San Jose, CA (US);
Ioana M. Delaney, San Jose, CA (US);
Mir H. Pirahesh, San Jose, CA (US);
Vijayshankar Raman, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 355 days.

(21) Appl. No.: 15/290,065

(22) Filed: Oct. 11, 2016

(65) Prior Publication Data
US 2018/0101569 A1 Apr. 12, 2018

(51) Int. Cl.
*G06F 16/2452* (2019.01)

(52) U.S. Cl.
CPC .............................. *G06F 16/2452* (2019.01)

(58) Field of Classification Search
CPC ......... G06F 17/30445; G06F 17/30923; G06F 17/30427; G06F 16/2452; H04L 51/14
USPC ....................................................... 707/760
See application file for complete search history.

(56) References Cited

U.S. PATENT DOCUMENTS

| | | | |
|---|---|---|---|
| 5,598,559 A | 1/1997 | Chaudhuri | |
| 6,430,550 B1 | 8/2002 | Leo et al. | |
| 7,110,999 B2 | 9/2006 | Colby et al. | |
| 7,133,858 B1 | 11/2006 | Larson et al. | |
| 7,469,241 B2 | 12/2008 | Bellamkonda et al. | |
| 7,487,140 B2 | 2/2009 | Chen et al. | |
| 2016/0378827 A1* | 12/2016 | Bondalapati | G06F 16/24542 707/718 |
| 2017/0031989 A1* | 2/2017 | Barbas | G06F 16/24537 |

OTHER PUBLICATIONS

Grumbach et al., Automatic Aggregation Using Explicit Metadata, Scientific and Statistical Database Management, 2000, Proceedings, 12th International Conference on IEEE, 2000.
Liu et al., A Framework for Global Optimization of Aggregate Queries, Proceedings of the Sixth International Conference on Information and Knowledge Management, ACM, 1997.

* cited by examiner

*Primary Examiner* — Cam Y T Truong
(74) *Attorney, Agent, or Firm* — Lieberman & Brandsdorfer, LLC

(57) ABSTRACT

Embodiments relate to aggregation operations. More specifically, embodiments relate to translating a query involving a distinct aggregate(s) into a query that does not involve a distinct aggregate. The translation involves a transformation effectively rewriting the original query containing the distinct aggregate including removal of the distinct aggregate from the query. The translated query enables the query to perform a non-distinct aggregation that effectively provides the results of the removed distinct aggregate(s).

15 Claims, 8 Drawing Sheets

EFFICIENT ANALYSIS OF DISTINCT AGGREGATIONS

BACKGROUND

The present embodiments relate to aggregation operations. More specifically, the embodiments relate to translating a query involving a distinct aggregate(s) into a query that does not involve a distinct aggregate.

Data aggregation is a process in which information is gathered and expressed in a summary form. Submitted data may be processed by an aggregate which is used to compute user specified operations over user specified data ranges. Examples of such aggregates include, "AVG" which functions to return the average of values defined in the expression, "BASE" which returns the total number of cases includes in the expression, "COUNT" which functions to return a count of cases in a column, "DISTINCT" which functions to return unique values, "MIN" which functions to return the lowest value, "MAX" which functions to return the highest value, "STDEV" which functions to return the standard deviation of the values defined in the expression, and "SUM" which functions to return the sum of the values defined in the submitted expression. In addition to these example aggregates, a distinct aggregate is defined as an aggregation performed on the results of a DISTINCT operation, e.g. SUM (DISTINCT (value(s))).

One popular database language that may be used to perform aggregations is Structured Query Language (SQL). An SQL statement is used to query or manipulate data in data storage. For example, a SELECT, UPDATE, INSERT or DELETE statement can be used with the SQL statement. A query using a SELECT statement may contain the following clauses, SELECT, FROM, WHERE, GROUP BY, HAVING, ORDER BY, and JOIN. The SELECT clause is used to specify the data of interest. The FROM clause indicates a source for the data. The WHERE clause indicates a condition for filtering the data. The GROUP BY clause allows organization of data into subsets. The HAVING clause places a condition on membership in a subset. The ORDER BY clause organizes the resultant data. The JOIN clause matches a row of one table with a row of another on the basis of a join condition. The query presented in the SQL statement is not limited to a single clause.

Any query under workspaces can suffer performance issues (e.g. become time consuming and memory intensive). In order to compute a query containing a distinct aggregate, a calculation of the aggregate's corresponding distinct values in the database must be performed. Queries containing distinct aggregates are particularly susceptible to suffering performance issues especially when the query contains multiple distinct aggregates since each aggregate has to be computed separately for values belonging to each category defined in the aggregate. Further, the performance issues with a query become exacerbated when performed in distributed environments, such as the cloud, due to the structure of the data storage and plurality of data storage options. Accordingly, it is desirable to provide a system and method for executing distinct aggregate operations in a manner that is less memory intensive and time consuming than current techniques.

SUMMARY

A system, computer program product, and method are provided to facilitate computation of a query containing a distinct aggregate.

In one aspect, a system is provided with a processing unit operatively coupled to a memory. A translator is in communication with the processing unit in order to facilitate re-organization of a query containing a distinct aggregate. The translator identifies a query having at least one distinct aggregate. More specifically, each identified distinct aggregate has at least one associated attribute. The query is translated by the translator. During the translation, a transformation is introduced in order to create at least one record for each distinct aggregate based on the associated at least one distinct aggregate attribute and input data. More specifically, the created record is composed from the input data. The at least one distinct aggregate is removed from the query. The translator introduces an organization of the at least one associated attribute based on the removed at least one distinct aggregate. The translated query is returned to perform a non-distinct aggregation in order to provide a result of the distinct aggregate.

In another aspect, a computer program product is provided to facilitate re-organization of a query containing a distinct aggregate. The computer program product includes a computer readable storage device with embodied code that is configured to be executed by a processor. More specifically, computer program code is embodied to identify a query having at least one distinct aggregate with each identified distinct aggregate having at least one associated attribute. The program code translates the query. The program code introduces a transformation in order to create at least one record for each distinct aggregate based on the associated at least one distinct aggregate attribute and input data. More specifically, the created record is composed from the input data. The program code removes the at least one distinct aggregate from the query, and introduces an organization of the at least one associated attribute utilizing the removed at least one distinct aggregate. The translated query is returned to perform a non-distinct aggregation in order to provide the result of the distinct aggregate.

In yet another aspect, a method to is provided to facilitate re-organization of a query containing a distinct aggregate. A query is identified having at least one distinct aggregate. More specifically, each identified distinct aggregate has at least one associated attribute. The query is translated. During the translation, a transformation is introduced to create at least one record for each distinct aggregate based on the associated at least one distinct aggregate attribute and input data. More specifically, the input record is composed from the input data. The at least one distinct aggregate is removed from the query. An organization of the at least one associated attributed based on the removed at least one distinct aggregate is introduced. The translated query is returned to perform a non-distinct aggregation in order to provide a result of the distinct aggregate.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

It will be readily understood that the components of the present embodiments, as generally described and illustrated in the Figures herein, may be arranged and designed in a wide variety of different configurations. Thus, the following detailed description of the embodiments of the apparatus, system, and method of the present embodiments, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiment of the present embodiments. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

In a database management system (DBMS), data is stored in one or more data containers with each container having records. The data within each record is organized into one or more fields. Two categories of the DBMS include a relational database system and an object oriented database. In relational database systems, the data containers are organized as tables, with the records referred to as rows, and the fields referred to as columns. In object oriented databases, the data containers are organized as object classes, with the records referred to as objects, and the fields referred to as attributes. There are other database architectures which use other terminology. The present embodiments are not limited to any particular type of data container or database architecture. However, for the purpose of explanation, the examples and the terminology used herein shall be that typically associated with relational databases. Accordingly, the terms "table", "row" and "column" shall be used herein to refer respectively to the data container, record, and field.

A system, method and computer program product to efficiently analyze distinct aggregates are provided, with embodiments, discussed below in detail. As shown and described, a query that contains a distinct aggregate(s) is translated to a query that does not contain a distinct aggregate. The translation involves rewriting the original query containing the distinct aggregate(s) by expanding each input record for the distinct aggregate into a plurality of records, performing an organization on records, and in one embodiment computing corresponding non-distinct aggregates across the records.

Figure 1:
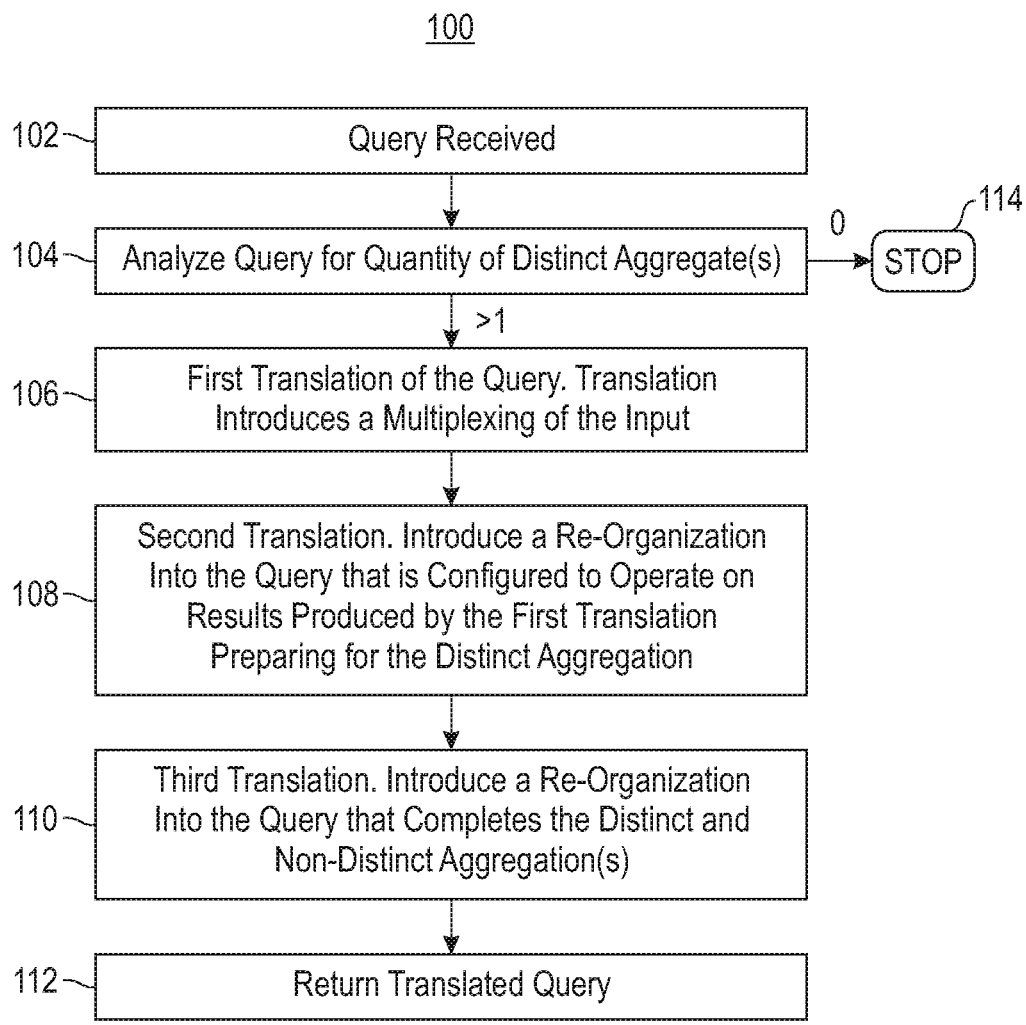
FIG. 1 depicts a flow chart illustrating an embodiment of translating a query containing one or more distinct aggregate(s) into a query containing no distinct aggregate(s).

Referring to FIG. 1, a flow chart is provided illustrating an embodiment of translating a query containing one or more distinct aggregate(s) into a query containing no distinct aggregate(s). As shown, a query is received (102) containing instructions. The query is analyzed to determine the quantity of distinct aggregate(s) (e.g. K distinct aggregates) the query may contain (104). Each distinct aggregate contains an input attribute, hereinafter referred to as an input. An input may be, but is not limited to, a category wherein the category may contain value(s), and an attribute of a column or row in a table. In one embodiment, the organization may include, but is not limited to, adding the K inputs of the K distinct aggregates to a GROUPBY clause, a JOIN clause and/or a list of data-reduction attributes. If no distinct aggregate(s) are found at step (104), a translation of the query is not performed and the process concludes (114). However, if at least one attribute is found at step (104), the query translation process continues. Accordingly, the first part of the query translation entails evaluation of the query instructions and identification of any distinct aggregates.

Following a determination at step (104) of at least one distinct aggregate, translation of the input query takes place to transform the query that original specified performing distinct aggregates into a query that produces correct output and no longer requires distinct aggregation support. In the example shown herein, the translation is a single translation that takes place in multiple steps, also referred to herein as multiple translations. A first translation, also referred to herein as a re-write of the query, introduces a multiplexing of the input found at step (104) that would produce at least one record per distinct aggregate (e.g. K record(s)), and an additional record if any non-distinct aggregation was requested or specified, for each record of the input source (106). Each produced record comprises a field(s) for the K input(s) to each of the K distinct aggregate(s) (e.g. K fields) and a value for the input to one of the K distinct aggregate(s). Following step (106), a second step, also referred to herein as a second translation, takes place to introduce a re-organization into the query that is configured to operate on results produced by the first translation. The re-organization is based on the original grouping attributes along with the input(s) to the distinct aggregate(s) in the original query, and performs the requested non-distinct aggregations (108).

Following step (108), a third step, also referred to herein as a third translation to the query (110) takes place and introduces a re-organization into the query that is configured to operate on results produced by the second translation. The re-organization is based on the original grouping attributes and also performs a corresponding aggregation to roll up the non-distinct aggregates, e.g. roll-up of the non-distinct aggregates utilizing corresponding non-distinct aggregations. An example of the roll-up may be SUM for COUNT. Also, during the third translation at step (110), the re-organization also introduces non-distinct aggregation for the originally specified distinct aggregation, which in one embodiment is a removal of the distinct qualifier from the aggregation. For example, if the first non-distinct aggregate was "COUNT", the translation at step (110) to a corresponding non-distinct aggregate would be "SUM." In this example, the corresponding non-distinct aggregate specifies a "SUM" of at least one "COUNT."

Following the third translation at step (110), the translated query is returned (112). It is understood that the translated query can be stored, executed, computed, further translated, etc. The query translation removes distinct aggregates from the query. As such, at such time as the translated query is executed, the translation enables processing of distinct aggregation on a system that has limited or no support for distinct aggregation. In one embodiment, this transformation enables scalable distinct computation(s). The query translation, by leveraging the base aggregation support which is traditionally more optimized, mitigates processing time and memory usage during execution. For example, in one embodiment, the query translation may be done by an entity processing the query, or a separate entity may provide translation support for the entity processing the query.

Figure 2A:
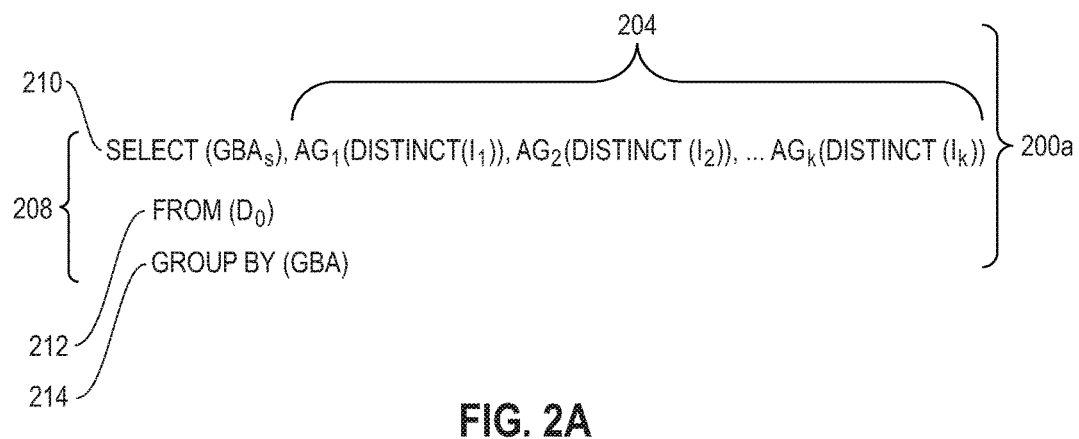
FIG. 2A-C depict diagrams illustrating an embodiment of a query translation from a query containing distinct aggregates to a query containing no distinct aggregate(s).

It is understood that a plurality of aggregates can be contained in a single query. Referring to FIG. 2A, a diagram (200) is provided illustrating an embodiment of a query containing distinct aggregates and translation to a query containing no distinct aggregate(s). As shown herein, "AG" represents an aggregate. In the example shown herein, the query is in SQL, although this embodiment should not be limiting. The query (200a) is shown comprising a SELECT statement (208) having a SELECT clause (210) having K distinct aggregates (204) hereinafter shown as $AG_1$(DISTINCT( )) through $AG_K$(DISTINCT( )). Each distinct aggregate has an input, I (e.g. K inputs), hereinafter shown as $I_1$ through $I_K$. Accordingly, the original query is shown herein containing K distinct aggregates with K inputs.

Additionally, the SELECT statement (208) is shown with a FROM clause (212) to designate the use of data storage, $D_0$, as a source for data. As known by one skilled in the art, the data storage specified in the FROM clause is not limited to a single data storage as a plurality of data storages can be specified. In one embodiment, a GROUPBY clause (214) is provided to organize the data by a group by attribute(s), GBA. A group by attribute may be, but is not limited to, the category of a value in the data storage, for instance a column header or row label. In one embodiment, the SELECT clause may include but is not limited to, a selection of the group by attribute(s) GBA as shown herein by $GBA_S$, wherein the selection, $GBA_S$, could be less than the group or the entire group of attribute(s), GBA. In one embodiment, the SELECT clause includes one or more other clauses. Accordingly, in the example shown herein, the original query is provided with a plurality of keyword clauses.

Figure 2B:
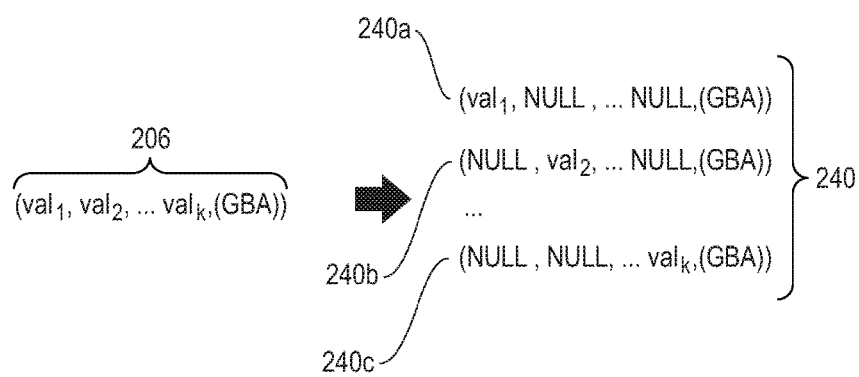

The query (200a) is received for translation and examined, as shown and described in FIG. 1. By examination of the SELECT clause (210), it is determined that the quantity of distinct aggregates (204) is K. In response to the determination of K distinct aggregates (204), referring to FIG. 2B, the input source (206) is gathered from the query (200a) based on the inputs, $I_1$-$I_K$, to the distinct aggregates (204) and the associated data source, $D_0$. K records (240) are created in response to determining K distinct aggregates with K inputs, and each record contains K fields and the group by attribute(s), GBA provided in the query (200a). Each record contains a value, hereinafter shown by "val," within a single K fields. For example, record (240a) contains value $val_1$, record (240b) contains value $val_2$, and record (240c) contains value $val_k$. In one embodiment, a field unoccupied by a value contains a NULL value to indicate absence of a value. Accordingly, records are created for the inputs to the distinct aggregates with each record containing a value for the input to one of the distinct aggregates.

Figure 2C:
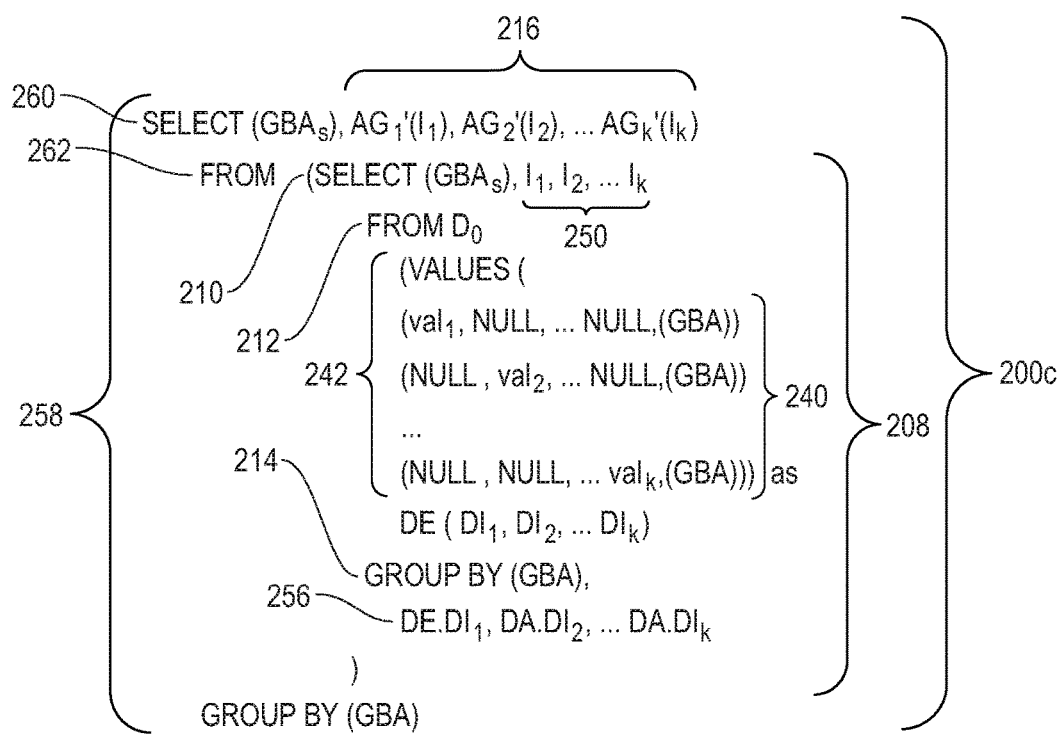

Data contained in input record (206) of distinct aggregates (204) is maintained when translating query (200a) into query translation (200c). Referring to FIG. 2C, the records (240) are added to the query translation (200c). The records (240) are added by creating a table (242) containing the K records (240) within the FROM clause (252). In one embodiment, the table (242) is distinctly expanded (256), such that the distinct arguments are expanded into separate rows. The K records (240) are organized by the inputs, $I_1$ to $I_K$, of the distinct aggregates (204), by adding the table (242) to the GROUPBY clause (214) as distinctly expanded variables (256). In one embodiment, the records may be organized based on the group by attributes, GBA, of the original query. Accordingly, as shown herein the query translation preserves the input source of the original query.

To ensure the records (240) are accessed properly during a computation of the translated query, the distinct aggregates (204) are removed from the query translation. The inputs (250), of the removed distinct aggregates (204), are added to the SELECT clause (210). The location of the inputs (250) allows the inputs to be directly accessed during computation of the query. The organization of the records and direct access to the inputs of the aggregates within the SELECT statement (208) creates a partially aggregated structure which if computed provides partially aggregated results. Accordingly, the query translation contains no distinct aggregate(s) and a partially aggregated structure.

In order to obtain the result of the query translation (200a), the removed distinct aggregates (204) are applied over the partially aggregated structure as non-distinct aggregates. The SELECT statement (208) is nested inside of a second SELECT statement (258) under the FROM clause (262). Additionally, non-distinct aggregates (216) corresponding to the removed distinct aggregates (204) and the inputs (250) to the removed distinct aggregates (204) are added in the SELECT clause (260). In one embodiment, SELECT clause (260) has the same selection of GROUPBY attribute(s), $GBA_S$, specified in the original query (200a), e.g. prior to translation. Accordingly, a query containing distinct aggregates is translated to a query containing no distinct aggregates, with the translation is configured to be computed to give the result of the query containing distinct aggregates.

Figure 3A:
FIG. 3A-C depict diagrams illustrating an embodiment of a query containing distinct aggregates and non-distinct aggregates being translated to a query containing no distinct aggregate(s).
Figure 3B:
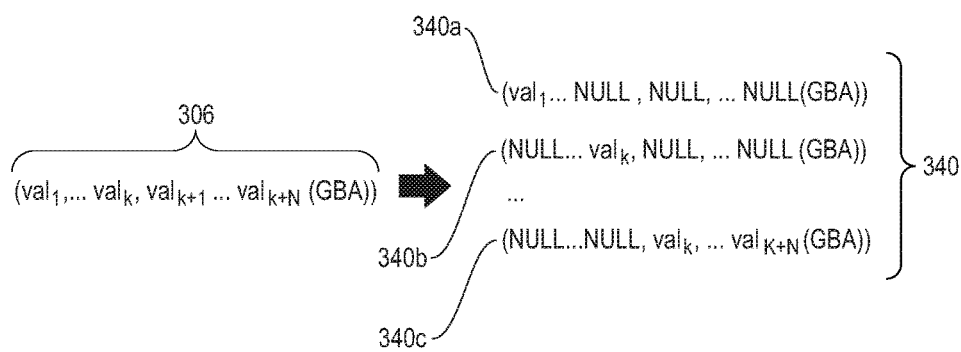
Figure 3C:
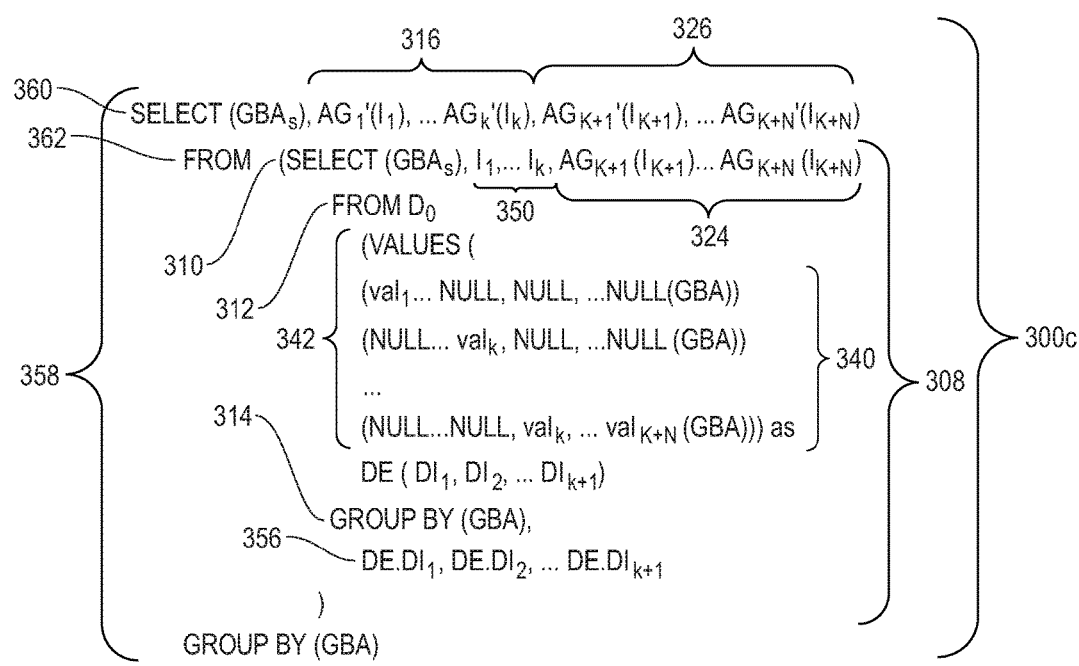

Distinct aggregates and non-distinct aggregates may appear in the same query. Similarly, a plurality of distinct aggregates and non-distinct aggregates can be contained in a single query. Referring to FIG. 3A, a diagram (300) is provided illustrating an embodiment of a query containing distinct aggregates and non-distinct aggregates being translated to a query containing no distinct aggregate(s). As shown herein, "AG" represents an aggregate. In one embodiment, a SQL query (300a) is shown comprising a SELECT statement (308) having a SELECT clause (310) having K distinct aggregates (304) hereinafter shown as $AG_1$ (DISTINCT( )) through $AG_K$ (DISTINCT( ) and N non-distinct aggregates (324) hereinafter shown as $AG_{K+1}$( ) through $AG_{K+N}$( ). Each distinct aggregate has an input (e.g. K inputs), hereinafter shown as $I_1$ through $I_K$ and each non-distinct aggregate has an input, hereinafter shown as $I_{K+1}$ through $I_{K+N}$. Accordingly, the query to be translated is shown herein containing K+N aggregates with K+N inputs.

Additionally, the SELECT statement (308) is shown with a FROM clause (312) to designate the use of data storage, $D_0$, as a source for data. In one embodiment, a GROUPBY clause (314) is provided to organize the data by a group by attribute(s), GBA. In one embodiment, the SELECT clause may include, but is not limited to, a selection of the GBA, the selection is shown herein by $GBA_S$, wherein the selection, $GBA_S$, could be less than the group or the entire group of attribute(s), GBA. In one embodiment, the SELECT clause includes one or more other clauses. Accordingly, in the example shown herein, the query to be translated is provided with a plurality of keyword clauses.

The query (300a) is received for translation and examined as shown and described in FIG. 1. By examination of the SELECT Clause (310) it is determined that the quantity of distinct aggregates (304) is K and the quantity of non-distinct aggregates is N. In response to the determination of K distinct aggregates (304) and N non-distinct aggregates (324), referring to FIG. 4B, the input source (306) is determined from the query (300a) based on the inputs, $I_1$-$I_K$, of the distinct aggregates (304), the inputs, $I_{K+1}$-$I_{K+N}$, of the non-distinct aggregates (324) and the associated data source, $D_0$. In response to the determination of K inputs of the distinct aggregates and N inputs of the non-distinct aggregates, K+1 records (340) are created and each record contains K+N fields and the group by attribute(s), GBA, provided in the query (300a). Each record contains at least one value, hereinafter shown by "val," within a single K field, or all value(s) for the N fields. For example, record (340a) contains value $val_1$, record (340b) contains value $val_k$, and record (340c) contains N values, $val_{k+1}$ through $val_{k+N}$. In one embodiment, a field unoccupied by a value contains a NULL value to indicate absence of a value. Accordingly, as shown herein the query translation may include creation of records for the inputs of the distinct and non-distinct aggregates with each record containing the value for the input to one of the distinct aggregates or the values to the non-distinct aggregates.

Data contained in input record (306) of distinct aggregates (304) and non-distinct aggregates (324) is maintained when translating query (300a) into query translation (300c). Referring to FIG. 4C, the records (340) are added to the query (300c). The records (340) are added by creating a table (342) containing the K records (340) within the FROM clause (352). In one embodiment, the table (342) is distinctly expanded (356), such that the distinct arguments are expanded into separate rows. The K records (340) are organized by the inputs, $I_1$ to $I_{K+N}$, to the distinct aggregates (304) and non-distinct aggregates (324) by adding the table (342) to the GROUP BY clause (314) as distinctly expanded variables (356). In one embodiment, the records may be organized based on the group by attributes, GBA, of the original query. Accordingly, as shown in this example, the translation preserves the input source of the original query.

To ensure the records (340) are accessed properly during a computation of the translated query, the distinct aggregates (304) are removed from the query translation. The inputs (350), to the removed distinct aggregates (304), are added to the SELECT clause (310). The location of the inputs (350) allows them to be directly accessed during computation of the translated query. In one embodiment, the organization of the records (340), direct access to the inputs (350) of the distinct aggregates (304), and non-distinct aggregates (304) within the SELECT statement (308) creates a partially aggregated structure which if computed provides partially aggregated results. Accordingly, the translated query shown herein contains no distinct aggregates and a partially aggregated structure.

In order to obtain the result of the original query (300a), the removed distinct aggregates (304) are applied over the partially aggregated structure. The SELECT statement (308) is nested inside of a second SELECT statement (358) under the FROM clause (362). Additionally, non-distinct aggregates (316) and (326) are added in the SELECT clause (360). The non-distinct aggregates (316) correspond to the removed distinct aggregates (304) and the inputs (350) to the removed distinct aggregates (304). The non-distinct aggregates (326) correspond to the non-distinct aggregates of the original query (324) and their corresponding inputs. In one embodiment, SELECT clause (360) has the same selection of group by attribute(s), $GBA_S$, specified in the original query (300a). Accordingly, a query containing distinct aggregates and non-distinct aggregates is translated to a query containing no distinct aggregate and can be computed to give the result of the query containing distinct aggregates.

Aspects of translating a query involving a distinct aggregate into a query that does not involve a distinct aggregate provided in FIG. 1 employ one or more functional tools to support use of a translation. Aspects of the functional tool, e.g. translator, and its associated functionality may be embodied in a computer system/server in a single location, or in one embodiment, may be configured in a cloud based system sharing computing resources. With references to FIG. 4, a block diagram (400) is provided illustrating an example of a computer system/server (402), hereinafter referred to as a host (402) in communication with a cloud based support system, to implement the processes described above with respect to FIG. 1. Host (402) is operational with numerous other general purpose or special purpose computing system environments or configurations. Examples of well-known computing systems, environments, and/or configurations that may be suitable for use with host (402) include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

Host (402) may be described in the general context of computer system-executable instructions, such as program modules, being executed by a computer system. Generally, program modules may include routines, programs, objects, components, logic, data structures, and so on that perform particular tasks or implement particular abstract data types. Host (402) may be practiced in distributed cloud computing environments where tasks are performed by remote processing devices that are linked through a communications network. In a distributed cloud computing environment, program modules may be located in both local and remote computer system storage media including memory storage devices.

Figure 4:
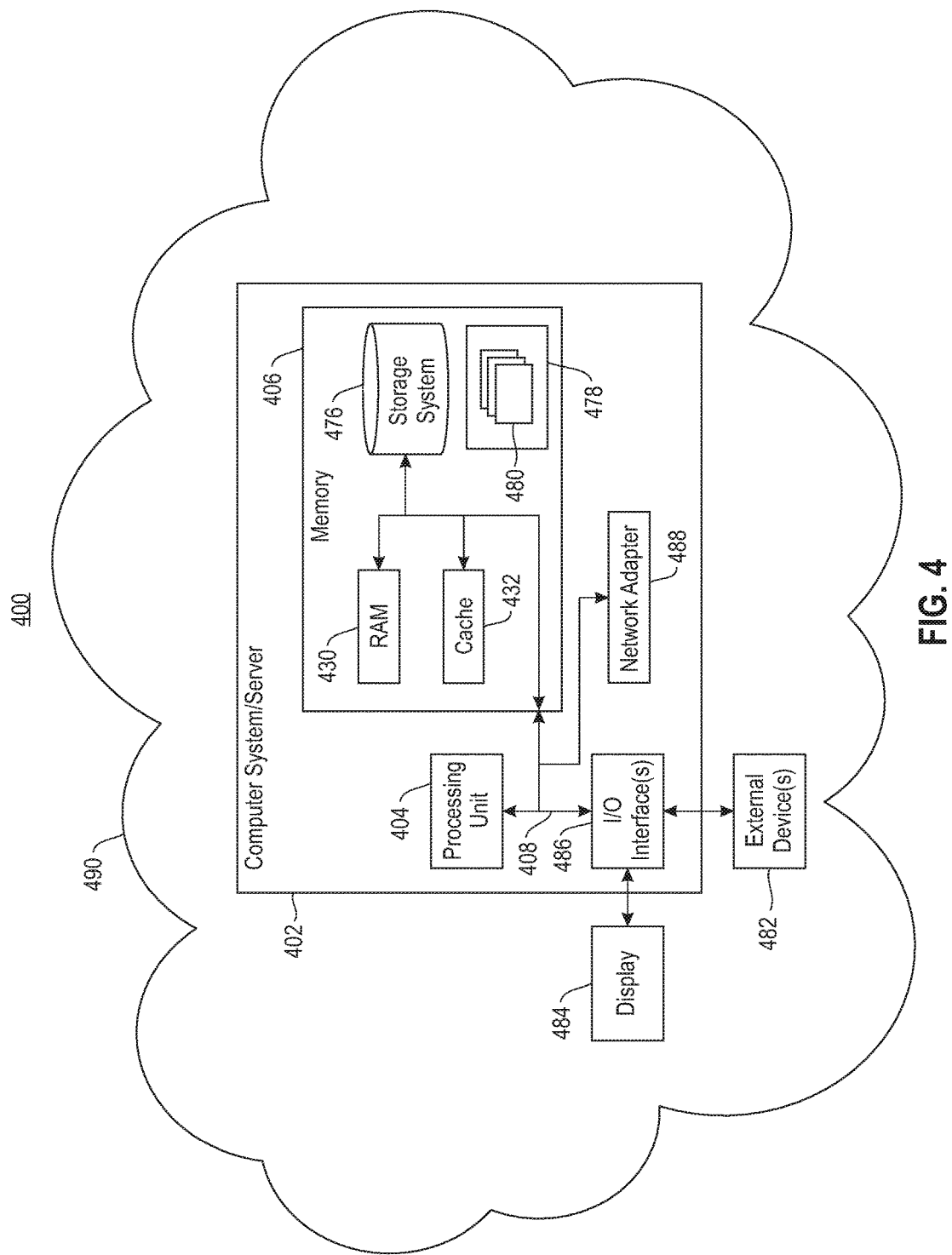
FIG. 4 is a block diagram illustrating an example of a computer system/server of a cloud based support system, to implement the process described above with respect to FIG. 1.

As shown in FIG. 4, host (402) is shown in the form of a general-purpose computing device. The components of host (402) may include, but are not limited to, one or more processors or processing units (404), a system memory (406), and a bus (408) that couples various system components including system memory (406) to processor (404). Bus (408) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host (402) typically includes a variety of computer system readable media. Such media may be any available media that is accessible by host (402) and it includes both volatile and non-volatile media, removable and non-removable media.

Memory (406) can include computer system readable media in the form of volatile memory, such as random access memory (RAM) (472) and/or cache memory (474). By way of example only, storage system (476) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (408) by one or more data media interfaces.

Program/utility (478), having a set (at least one) of program modules (480), may be stored in memory (406) by way of example, and not limitation, as well as an operating system, one or more application programs, other program modules, and program data. Each of the operating systems, one or more application programs, other program modules, and program data or some combination thereof, may include an implementation of a networking environment. Program modules (480) generally carry out the functions and/or methodologies of embodiments to store and analyze data. For example, the set of program modules (480) may include the modules configured as a translator in order to translate a query involving a distinct aggregate into a query that does not involve a distinct aggregate as described in FIG. 1.

Host (402) may also communicate with one or more external devices (482), such as a keyboard, a pointing device, etc.; a display (484); one or more devices that enable a user to interact with host (402); and/or any devices (e.g., network card, modem, etc.) that enable host (402) to communicate with one or more other computing devices. Such communication can occur via Input/Output (I/O) interface(s) (486). Still yet, host (402) can communicate with one or more networks such as a local area network (LAN), a general wide area network (WAN), and/or a public network (e.g., the Internet) via network adapter (488). As depicted, network adapter (488) communicates with the other components of host (402) via bus (408). In one embodiment, a plurality of nodes of a distributed file system (not shown) is in communication with the host (402) via the I/O interface (486) or via the network adapter (488). It should be understood that although not shown, other hardware and/or software components could be used in conjunction with host (402). Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory (406), including RAM (472), cache (474), and storage system (476), such as a removable storage drive and a hard disk installed in a hard disk drive.

Computer programs (also called computer control logic) are stored in memory (406). Computer programs may also be received via a communication interface, such as network adapter (488). Such computer programs, when run, enable the computer system to perform the features of the present embodiments as discussed herein. In particular, the computer programs, when run, enable the processing unit (404) to perform the features of the computer system. Accordingly, such computer programs represent controllers of the computer system.

The present embodiments may be a system, a method, and/or a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

In one embodiment, host (402) is a node (490) of a cloud computing environment. As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 5:
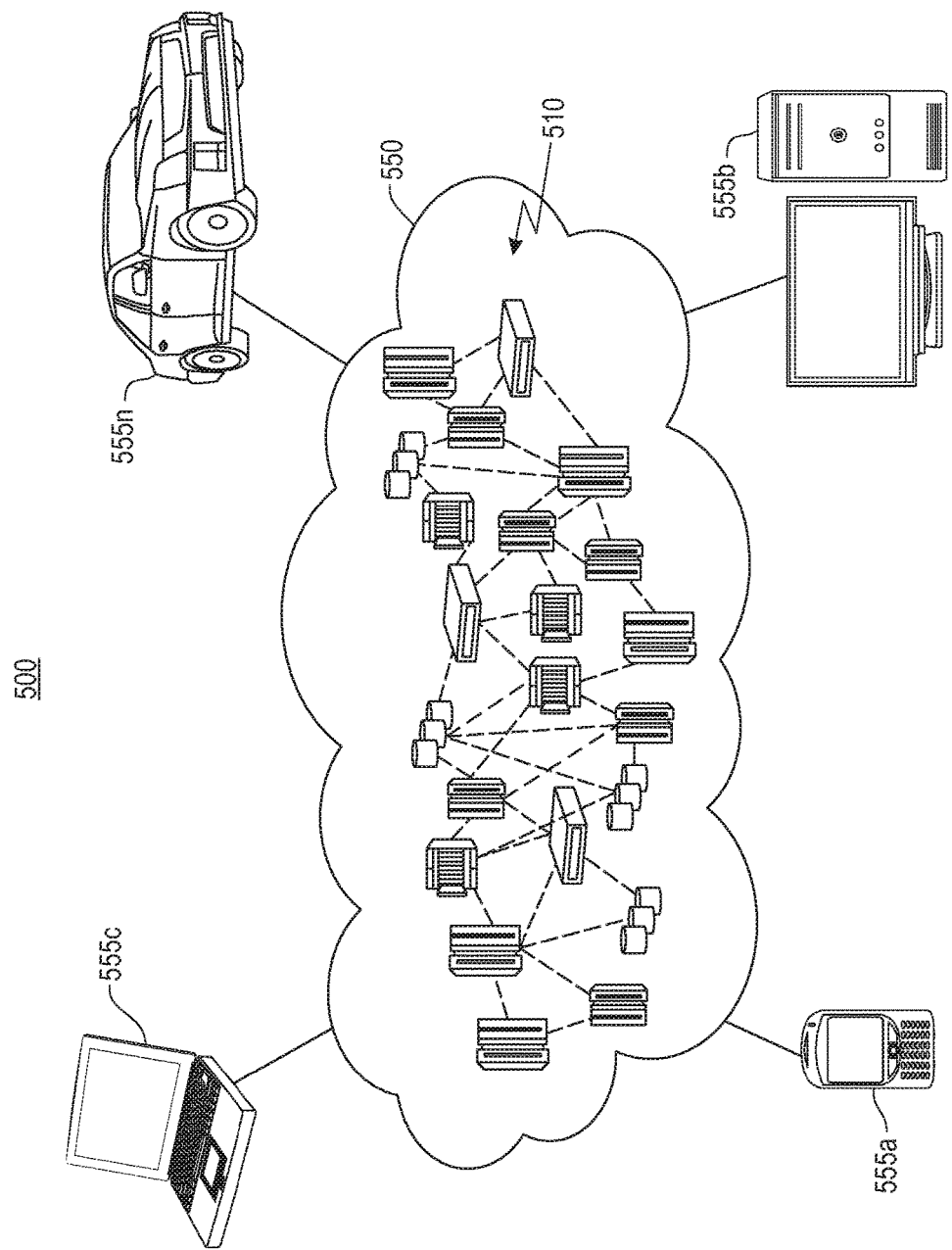
FIG. 5 depicts a block diagram illustrating a cloud computer environment.

Referring now to FIG. 5, an illustrative cloud computing network (500). As shown, cloud computing network (500) includes a cloud computing environment (550) having one or more cloud computing nodes (510) with which local computing devices used by cloud consumers may communicate. Examples of these local computing devices include, but are not limited to, personal digital assistant (PDA) or cellular telephone (555A), desktop computer (555B), laptop computer (555C), and/or automobile computer system (555N). Individual nodes within nodes (510) may further communicate with one another. They may be grouped (not shown) physically or virtually, in one or more networks, such as Private, Community, Public, or Hybrid clouds as described hereinabove, or a combination thereof. This allows cloud computing environment (500) to offer infrastructure, platforms and/or software as services for which a cloud consumer does not need to maintain resources on a local computing device. It is understood that the types of computing devices (555A-N) shown in FIG. 5 are intended to be illustrative only and that the cloud computing environment (550) can communicate with any type of computerized device over any type of network and/or network addressable connection (e.g., using a web browser).

Figure 6:
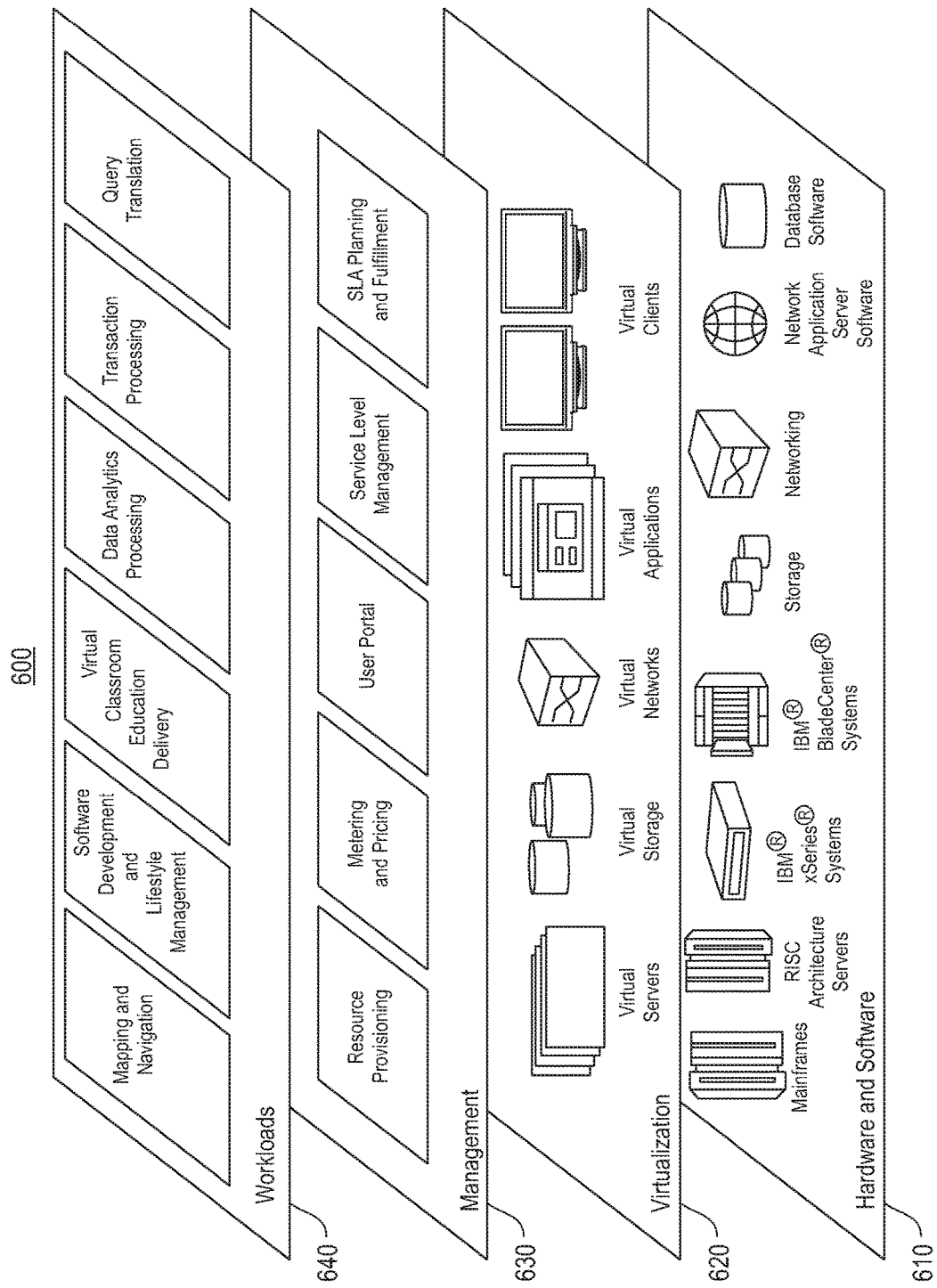
FIG. 6 depicts a block diagram illustrating a set of functional abstraction model layers provided by the cloud computing environment.

Referring now to FIG. 6, a set of functional abstraction layers provided by the cloud computing network of FIG. 4 is shown. It should be understood in advance that the components, layers, and functions shown in FIG. 6 are intended to be illustrative only, and the embodiments are not limited thereto. As depicted, the following layers and corresponding functions are provided: hardware and software layer (610), virtualization layer (620), management layer (630), and workload layer (640). The hardware and software layer (610) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (620) provides an abstraction layer from which the following examples of virtual entities may be provided: virtual servers; virtual storage; virtual networks, including virtual private networks; virtual applications and operating systems; and virtual clients.

In one example, management layer (630) may provide the following functions: resource provisioning, metering and pricing, user portal, service level management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer (640) provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and query translation. Specifically, the workload layer (640) supports the query transformation disclosed above in FIG. 1 to provide processing of distinct aggregates in a shared resource environment.

As will be appreciated by one skilled in the art, the aspects may be embodied as a system, method, or computer program product. Accordingly, the aspects may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, the aspects described herein may take the form of a computer program product embodied in one or more computer readable medium(s) having computer readable program code embodied thereon.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

The embodiments are described above with reference to flow chart illustrations and/or block diagrams of methods, apparatus (systems), and computer program products. It will be understood that each block of the flow chart illustrations and/or block diagrams, and combinations of blocks in the flow chart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow chart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow chart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions, which execute on the computer or other programmable apparatus, provide processes for implementing the functions/acts specified in the flow chart and/or block diagram block or blocks.

The flow charts and block diagrams in the Figures illustrate the architecture, functionality, and operation of possible implementations of systems, methods, and computer program products according to various embodiments. In this regard, each block in the flow charts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow chart illustration(s), and combinations of blocks in the block diagrams and/or flow chart illustration(s), can be implemented by special purpose hardware-based systems that perform the specified functions or acts, or combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising,"

when used in this specification, specify the presence of stated features, integers, steps, operations, elements, and/or components, but do not preclude the presence or addition of one or more other features, integers, steps, operations, elements, components, and/or groups thereof.

The embodiments described herein may be implemented in a system, a method, and/or a computer program product. The computer program product may include a computer readable storage medium (or media) having computer readable program instructions thereon for causing a processor to carry out the embodiments described herein.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmissions, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The embodiments are described herein with reference to flow chart illustrations and/or block diagrams of methods, apparatus (systems), and computer program products. It will be understood that each block of the flow chart illustrations and/or block diagrams, and combinations of blocks in the flow chart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow chart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flow chart and/or block diagram block or blocks.

It will be appreciated that, although specific embodiments have been described herein for purposes of illustration, various modifications may be made without departing from the spirit and scope of the specific embodiments described herein. Accordingly, the scope of protection is limited only by the following claims and their equivalents.

Aspects of the present embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to the embodiments in the form disclosed.

Indeed, executable code could be a single instruction, or many instructions, and may even be distributed over several different code segments, among different applications, and across several memory devices. Similarly, operational data may be identified and illustrated herein within the tool, and may be embodied in any suitable form and organized within any suitable type of data structure. The operational data may be collected as a single dataset, or may be distributed over different locations including over different storage devices, and may exist, at least partially, as electronic signals on a system or network.

Furthermore, the described features, structures, or characteristics may be combined in any suitable manner in one or more embodiments. In the following description, numerous specific details are provided, such as examples of agents, to provide a thorough understanding of the disclosed embodiments. One skilled in the relevant art will recognize, however, that the embodiments can be practiced without one or more of the specific details, or with other methods, components, materials, etc. In other instances, well-known structures, materials, or operations are not shown or described in detail to avoid obscuring aspects of the embodiments.

The corresponding structures, materials, acts, and equivalents of all means or step plus function elements in the claims below are intended to include any structure, material, or act for performing the function in combination with other claimed elements as specifically claimed. The description of the present embodiments have been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiment was chosen and described in order to best explain the principles of the embodiments and the practical application, and to enable others of ordinary skill in the art to understand the embodiments for various embodiments with various modifications as are suited to the particular use contemplated. Accordingly, the implementation of translating a query involving a distinct aggregate into a query that does not involve a distinct aggregate provides an efficient analysis of the original query.

It will be appreciated that, although specific embodiments have been described herein for purposes of illustration, various modifications may be made without departing from the spirit and scope of the embodiments. In particular, the number of clauses, statements and aggregates in a query should not be considered limiting. In one embodiment, the translator can be located on a different computer system than the data storage and the system sending the query. Similarly, in one embodiment, a list of reduction attributes may be used to perform an organization wherein a general query language is used, such a map-reduce. In another embodiment, a SELECT statement may contain a GROUP BY, WHERE, ORDER BY, HAVING, JOIN or one or more other clauses. In one embodiment, the query may consist of multiple SELECT statements and/or one or more other clause. Accordingly, the scope of protection of these embodiments is limited only by the following claims and their equivalents.

What is claimed is:

1. A computer system comprising:
a memory;
a processing unit operatively coupled to the memory; and
a translator in communication with the processing unit to re-organize a query containing at least two distinct aggregates, including:
identify the query having the at least two distinct aggregates each distinct aggregate having at least one associated attribute;
translate the query, including: introduce a transformation to create at least one record for each distinct aggregate based on at least one associated distinct aggregate attribute and input data, wherein the created at least one record is subject to an organization which employs an attribute selected from a group consisting of: a GROUPBY clause, a JOIN clause, and a list of data-reduction attributes;
remove the at least two distinct aggregates from the query;
add an additional organization to the query, wherein the additional organization refers to the at least one associated distinct aggregate attribute;
introduce an organization of the at least one associated attribute based on the removed at least two distinct aggregates; and
return the translated query to perform a non-distinct aggregation providing a result of the at least two distinct aggregates.

2. The system of claim 1, further comprising the translator to create a non-distinct record for any non-distinct aggregate based on an associated at least one attribute.

3. The system of claim 1, wherein the translation utilizes a NULL value to indicate an absence of a value.

4. The system of claim 1, wherein the translated query is processed local to a data provider.

5. The system of claim 1, wherein the translation is performed by an intermediate entity between an application and a data provider.

6. A computer program product for re-organizing a query containing at least two distinct aggregates, the computer program product comprising a computer readable storage memory having program code embodied therewith, the program code executable by a processing unit to:
identify the query having the at least two distinct aggregates each distinct aggregate having at least one associated attribute;
translate the query, including program code to: introduce a transformation to create at least one record for each distinct aggregate based on at least one associated distinct aggregate attribute and input data, wherein the created at least one record is subject to an organization which employs an attribute selected from a group consisting of: a GROUPBY clause, a JOIN clause, and a list of data-reduction attributes;
remove the at least two distinct aggregates from the query;
add an additional organization to the query, wherein the additional organization refers to the at least one associated distinct aggregate attribute;
introduce an organization of the at least one associated attribute based on the removed at least two distinct aggregates; and
return the translated query to perform a non-distinct aggregation providing a result of the at least two distinct aggregates.

7. The computer program product of claim 6, further comprising program code to create a non-distinct record for any non-distinct aggregate based on an associated at least one attribute.

8. The computer program product of claim 6, wherein each record contains a NULL value to indicate an absence of a value.

9. The computer program product of claim 6, wherein the translated query is processed local to a data provider.

10. The computer program product of claim 6, wherein the translation is performed by an intermediate entity between an application and a data provider.

11. A method to re-organize a query containing at least two distinct aggregates comprising:
identifying, by a computer, the query having the at least two distinct aggregates each distinct aggregate having at least one associated attribute;
translating, by the computer, the query, wherein the translation includes: introducing a transformation including creating at least one record for each distinct aggregate based on at least one associated distinct aggregate attribute and input data, wherein the created at least one record is subject to an organization which employs an attribute selected from a group consisting of: a GROUPBY clause, a JOIN clause, and a list of data-reduction attributes;
removing, by the computer, the at least two distinct aggregates from the query;
add an additional organization to the query, wherein the additional organization refers to the at least one associated distinct aggregate attribute;
introducing, by the computer, an organization of the at least one associated attribute based on the removed at least two distinct aggregates; and
returning, by the computer, the translated query to perform a non-distinct aggregation providing a result of the least two distinct aggregates.

12. The method of claim 11, further comprising creating a non-distinct record for any non-distinct aggregate based on an associated at least one attribute.

13. The method of claim 11, wherein each record contains a NULL value to indicate an absence of a value.

14. The method of claim 11, wherein the translated query is processed local to a data provider.

15. The method of claim 11, wherein the translating is performed by an intermediate entity between an application and a data provider.

* * * * *